US005987328A

United States Patent [19]
Ephremides et al.

[11] Patent Number: 5,987,328
[45] Date of Patent: Nov. 16, 1999

[54] METHOD AND DEVICE FOR PLACEMENT OF TRANSMITTERS IN WIRELESS NETWORKS

[76] Inventors: Anthony Ephremides, 5809 Nicholson La. #1004, N. Bethesda, Md.; Dimitrios Stamatelos, 6104 Breezewood Dr. #302, Greenbelt, Md.

[21] Appl. No.: 08/847,403

[22] Filed: Apr. 24, 1997

[51] Int. Cl.$^6$ ................................ H04B 1/06; H01S 4/00
[52] U.S. Cl. ..................... 455/446; 455/456; 455/452; 455/525
[58] Field of Search ..................... 455/456, 446, 455/447, 449, 67.1, 67.3, 62, 63, 525, 452

[56] References Cited

U.S. PATENT DOCUMENTS

| | | | |
|---|---|---|---|
| 4,257,123 | 3/1981 | Birt et al. | 455/115 |
| 5,058,200 | 10/1991 | Huang et al. | 455/33 |
| 5,179,722 | 1/1993 | Gunmar et al. | 455/33.1 |
| 5,448,766 | 9/1995 | Sanning et al. | 455/103 |
| 5,732,358 | 3/1998 | Sawaya et al. | 455/525 |
| 5,754,739 | 5/1998 | Goldberg | 395/61 |

*Primary Examiner*—Wellington Chin
*Assistant Examiner*—Sheila Smith
*Attorney, Agent, or Firm*—Watson Cole Grindle Watson P.L.L.C.

[57] ABSTRACT

From layout and attenuation data of an area and an initial guess, the placement and power levels of base stations and the resulting attenuation and base station ranges are calculated based on any chosen propagation model. A cost function is calculated which indicates the merit of the initial guess placement. The cost function is a function of the transmitter locations and power levels and can be calculated as a linear combination of the uncovered and interference areas. Other cost functions can also be considered. The cost function is optimized by one of several optimization methods to give the optimal base station placement. The optimization can be continuous or discrete. Continuous optimization methods include the modified steepest descent method and the downhill simplex method, while discrete optimization methods include the Hopfield neural network method. The optimization can be performed several times for different initial guess placements to achieve a global, rather than simply local, optimization. The entire optimization process is packaged in the form of an interactive software tool that permits the designer to steer and adjust the solution according to any criteria that the designer may choose.

21 Claims, 8 Drawing Sheets

METHOD AND DEVICE FOR PLACEMENT OF TRANSMITTERS IN WIRELESS NETWORKS

FIELD OF THE INVENTION

The present invention is directed to a method for placement of transmitters in an indoor or outdoor wireless network to optimize coverage.

DESCRIPTION OF RELATED ART

The use of radio for wireless data and voice communications provides users with the convenience of portability and mobility. It also reduces wiring installations and permits the creation of new communication services.

However, wireless communications systems must offer performance at least comparable to that of existing wired systems and must do so at low complexity and cost. At the same time, they must be compatible with existing wire and cable as well as with future optical fiber based communication systems.

Urban (outdoor) environments and buildings and other shielded (indoor) environments present a harsh environment for high-speed radio transmission, primarily because of multiple reflections on walls, furniture, machinery, and other obstacles. The link between any pair of transceivers is thus distorted because of multipath distortion and shadow fading, with the consequence of reduced communication range coverage. Furthermore, the resulting impairment is time-varying and unpredictable because it depends on the number and position of the mobile units.

Traditionally, work in this area has concentrated on measurements and channel modeling techniques. Not enough work has been done on the architecture of the wireless network.

The following references are related to the design of wireless networks. The disclosures of all of these references are hereby incorporated in their entireties into the present disclosure.

U.S. Pat. No. 5,551,066 to Stillman et al, Aug. 27, 1996;
U.S. Pat. No. 5,491,644 to Pickering et al, Feb. 13, 1996;
U.S. Pat. No. 5,465,390 to Cohen, Nov. 7, 1995;
U.S. Pat. No. 5,463,673 to Herscovici, Oct. 31, 1995;
U.S. Pat. No. 5,434,798 to Madebrink et al, Jul. 18, 1995;
U.S. Pat. No. 5,293,640 to Gunmar et al, Mar. 8, 1994;
U.S. Pat. No. 5,265,150 to Helmkamp et al, Nov. 23, 1993;
U.S. Pat. No. 4,835,709 to Tsai, May 30, 1989;

[1] T. Holt, K. Pahlavan, and J. Lee, "A Graphical Indoor Radio Channel Simulator using 2D Ray Tracing," in *Proceedings of the 3rd International IEEE Symposium on Personal, Indoor and Mobile Radio Communications*, Boston, Mass., pp. 411–416, Oct. 19–21, 1992;

[2] M. A. Panjwani, A. L. Abbott, T. S. Rappaport, and J. Haagh, "An Interactive System for Visualizing Wireless Communication Coverage within Buildings," in *Proceedings of Virginia Tech's 4th Symposium on Wireless Personal Communications*, Blacksburg, Va., Jun. 1–3, 1994;

[3] S. Y. Seidel and T. S. Rappaport, "914 MHz Path Loss Prediction Models for Indoor Wireless Communications in Multifloored Buildings," *IEEE Transactions on Antennas and Propagation*, Vol. 40, pp. 207–217, February, 1992;

[4] S. Y. Seidel and T. S. Rappaport, "A Ray Tracing Technique to Predict Path Loss and Delay Spread Inside Buildings," in *Proceedings of IEEE Globecom'92*, Orlando, Fla., Dec. 6–9, 1992, pp. 1825–1829, 1992;

[5] R. A. Valenzuela, "A Ray Tracing Approach to Predicting Indoor Wireless Transmission," in *Proceedings of 43rd IEEE Vehicular Technology Conference*, pp. 214–218, 1993;

[6] C. M. P. Ho, T. S. Rappaport, and P. Koushik, "Antennas Effects on Indoor Obstructed Wireless Channels and a Deterministic Image-Based Wideband Propagation Model for In-Building Personal Communication Systems," *International Journal on Wireless Information Networks*, Vol. 1, no. 1, pp. 61–76, 1994;

[7] D. Stamatelos and A. Ephremides, "Multiple Access Capability of Indoor Wireless Networks Using Spatial Diversity," in *Proceedings of the 5th International IEEE Symposium on Personal, Indoor and Mobile Radio Communications*, The Hague, Netherlands, Sep. 19–23, 1994;

[8] D. Stamatelos, "Spectral Efficiency and Optimal Base Placement for Indoor Wireless Networks," Master's thesis, University of Maryland, College Park, Md. 20742, May 1995; and

[9] D. Stamatelos and A. Ephremides, "Spectral Efficiency and Optimal Base Placement for Indoor Wireless Networks," *IEEE Journal on Selected Areas in Communications*, Vol. 14, No. 4, May, 1996, pp. sorry ass mother 651–61.

Throughout this specification, reference will be made to the non-patent publications listed above by their numbers in brackets, e.g., [1].

SUMMARY OF THE INVENTION

It is an object of the invention to provide flexible and realistic design for wireless networks.

It is a further object of the invention to provide such flexible and realistic design for types of services and technologies which conflict in nature.

It is a further object of the invention to provide such flexible and realistic design which achieves users' specifications at minimal cost.

It is a further object of the invention to provide such flexible and realistic design which is interactive and user-friendly and which allows easy on-screen changes to the network components and characteristics.

It is a further object of the invention to provide such flexible and realistic design which can be structured as a knowledge-based expert system capable of selecting the optimum solution when both quantitative and qualitative or "fuzzy" performance indices are involved.

To these and other objects, the present invention is directed to a method of placing a number N of transmitters in a service area which has unblocked points where the transmitters may be located and blocked points in which the transmitters may not be located, each of the transmitters having a power $p_i$, i=1 to N, the method comprising: (a) providing a processor which comprises an input means for receiving an input to a user and an output means for displaying an output to the user; (b) inputting to the processor, by use of the input means, data comprising N, $p_i$ for i=1 to N, a blocked point location data set identifying locations of the blocked points, an attenuation data set identifying attenuation characteristics of both the blocked points and the unblocked points that is based on any chosen propagation model, and initial guess values for $(x_i, y_i)$, $i=1$ to N, where $(x_i, y_i)$ are x and y coordinates for an ith one of the transmitters; (c) calculating in the processor, in accordance with the data input in step (b), signal strength at each point of the contoured area for each of the transmitters; (d) calculating in the processor, in accordance with attenuation characteristics calculated in step (c), (i) a size U of an uncovered area in which signals from the transmitters could not reach if the transmitters were positioned at the initial guess values, (ii) a size I of an interference area in which interference among the signals from the transmitters would prevent service if the transmitters were positioned at the initial guess values, and (iii) a cost function F which is a function of U and I or more generally a function of the transmitter location and power $(x_i, y_i, p_i)$; (e) by use of the processor, optimizing the cost function to produce an optimal set of transmitter locations and powers; (f) outputting to the user, by use of the output means, locations and powers of the transmitters which achieve the optimum value of the cost function produced in step (e); and (g) placing the transmitters in the locations output in step (f).

BRIEF DESCRIPTION OF THE DRAWINGS

The preferred embodiment of the present invention will now be set forth in detail with reference to the drawings, in which.

DETAILED DESCRIPTION OF THE PREFERRED EMBODIMENT

The preferred embodiment was developed in support of the inventors' investigation in the area of wireless networks. It provides the network designer the ability to describe indoor or outdoor environments, to predict attenuation levels throughout the area, to estimate cell coverage, to compute the cost functions we describe later, and to find the optimal location and power of the base-stations. The designer, interacting with the tool through the graphical user interface, is able to change the optimization parameters (number of base stations, base-station location, transmitted power, number of elements of the arrays etc.), obtain the performance measures of a particular network configuration, and finally get the configurations that satisfy the designer's specifications.

The software used to perform computational tasks in the preferred embodiment is programmed in C, while the user interface and the graphics functions are handled by Matlab (a trademark of Mathworks, Inc.) high-level routines. The user interface meets the requirements for interactivity and simplicity in use. The system is portable; versions for X-Windows and Microsoft Windows platforms are already available, and the preferred embodiment could be ported to other personal computers, workstations, minicomputers, mainframes, or other computing devices as needed.

Figure 1:
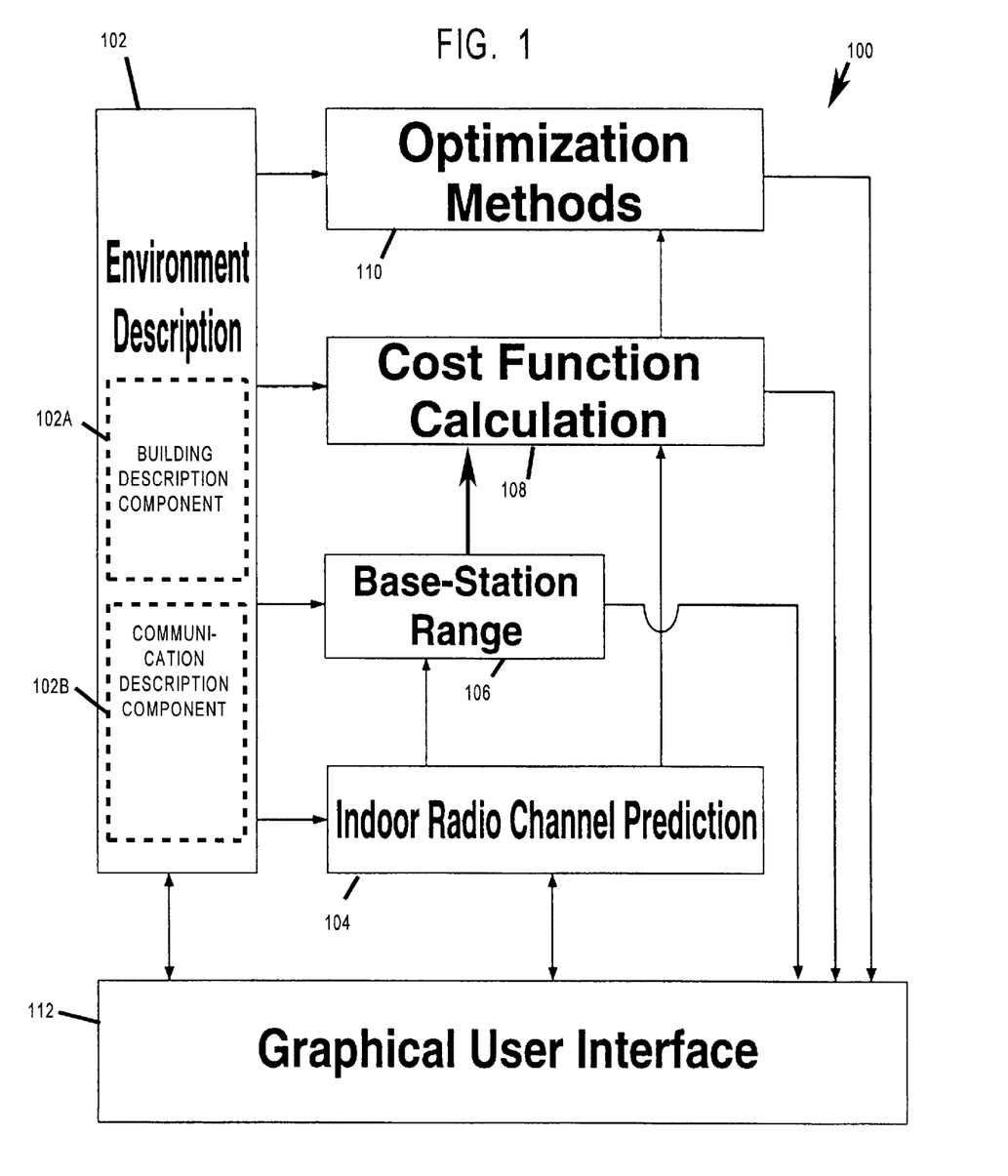
FIG. 1 shows a block diagram of a modular organization of the preferred embodiment.

As shown in FIG. 1, the preferred embodiment is organized as a plurality of independent modules. The modules communicate with one another through well-defined interfaces. Modularity is useful because it simplifies development, testing, expansion, and customization. This approach permits one system module to be updated at a later time without the need to redesign the rest of the system. For example, if a more sophisticated channel prediction model (used to determine signal attenuation) becomes available in the future, or another cost function is proved to serve better as a placement criterion, this portion of the system is the only one which needs to be updated.

Adapted to indoor environments, system 100 includes environment description module 102, indoor radio channel prediction module 104, base station range module 106, cost function calculation module 108, optimization module 110, and graphical user interface module 112. Each of these modules will now be described in turn. Substitution for module 104 with an outdoor radio channel prediction module suffices to make the embodiment applicable to outdoor wireless systems.

Environment description module 102 serves as a database, containing environment information and communication parameters which may be accessed by all other modules as needed. his module may be subdivided into 1) building description component 102A, and 2) communication description component 102B.

Figure 2A:
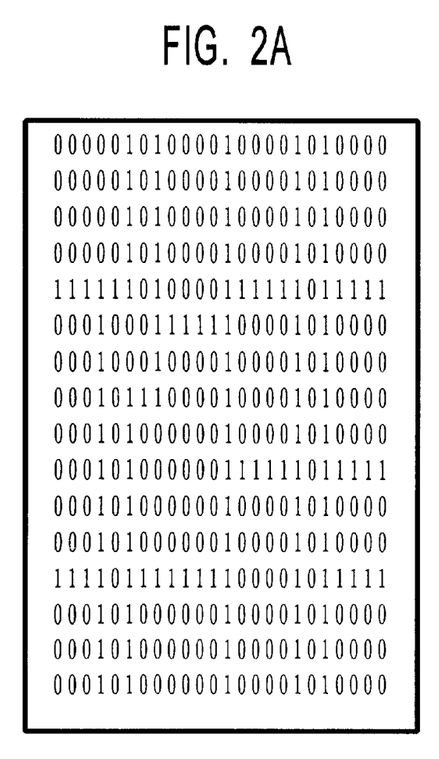
FIG. 2A shows an area contour layout file used in the preferred embodiment.
Figure 2B:
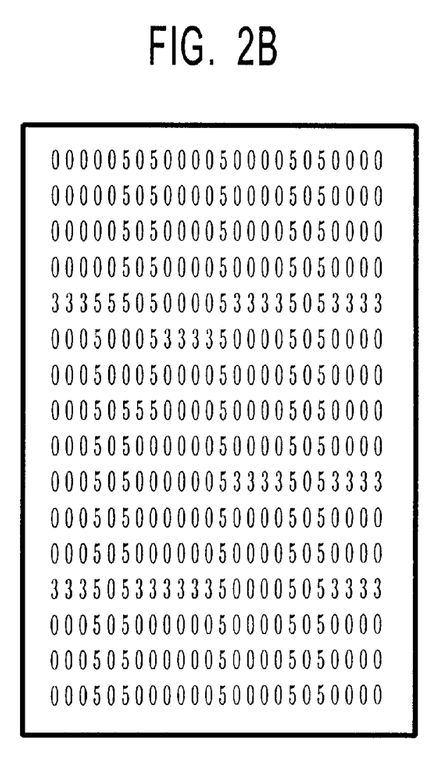
FIG. 2B shows an attenuation file used in the preferred embodiment.

The building description component maintains two files for each building, as shown in FIGS. 2A and 2B. The first, identified by extension ".l" (for "layout") and shown in FIG. 2A, presents the building layout inscribed in a parallelogram and discretized by the superimposition of a grid of user-defined density. The points of the grid where base-stations can be mounted are marked as "0," while the points of the grid where walls, partitions or other kind of obstacles are present, are marked as "1." The second file, identified by extension ".a" (for "attenuation") and shown in FIG. 2B, includes, for every point of the grid, the attenuation factors that are used by the statistical signal attenuation model, or the reflection, diffraction and transmission characteristic values that are used by the ray tracing model. These models are used in determining base station ranges, as will be explained below.

The communication description component maintains the location of the base stations and other interference sources. Other attributes that are stored here include transmitting power, minimum SNR, and receiver sensitivity. The results of any action and calculation are stored here as well.

Indoor radio channel prediction module 104 predicts path loss in an indoor environment. It accepts as inputs from the environment description module the layout and the propagation characteristics of the building floor. Then it either (i) outputs to the cost function and the base-station range modules the path loss between two points on the floor or (ii) displays the "iso-attenuation" curves on the building floor. The density of these curves is user-defined, as is the choice of whether to perform operation (i) or (ii).

Currently two attenuation prediction methods have been implemented:

1. Statistical attenuation model [3]: The signal is assumed to attenuate with distance, as in free space. When the signal encounters obstructions, the attenuation factors of the obstructions are added. This method generates accurate results for open plan buildings for a frequency range from 900 MHz to 4 GHz.
2. Ray tracing method [1, 4, 5, 6]: The ray tracing method is employed to track the multiple paths that the signal follows to reach the receiver. This method has the advantage of being applicable in cases where statistical methods fail. However, ray tracing is extremely time-consuming and computation-intensive.

The statistical attenuation model is preferred for predicting coverage for omnidirectional antennas and during the optimization procedure because of its computational efficiency. In the case of systems with adaptive antenna arrays however, more detailed modeling is required, and the ray tracing method is therefore used. Both models describe fading satisfactorily.

The base station range module predicts cell boundaries within an area and displays the cell contours directly on the area map. To determine the cell boundaries of a base station the base station range module estimates at every point in the area the energy that arrives from this base station. It then compares this estimate with the preset antenna sensitivity threshold. The points where received power is larger than this threshold are inside the cell area of the base-station.

It is assumed that signals propagate uniformly in all directions from the transmitter. The "ideal" circular pattern is distorted when interference sources and/or obstructions are present. It is further assumed that the cell areas are always simple closed regions and that a single cell area is never subdivided into separate non-contiguous areas.

The border of the cell area is drawn by connecting its outer points. Furthermore, several "security" curves, i.e., curves whose points exceed by a certain amount the sensitivity threshold, can also be drawn. Their density is set by the user through the user interface module, which will be described below.

The cost function calculation module calculates the measure of merit for a given network configuration; the measure of merit is called a cost function. An energy-based cost function takes the form of a linear combination of the area that is insufficiently covered (uncovered area) and the area where interference from other base-stations occurs (interference area). The size of these areas depends on the location $(x_i, y_i)$ and the power $p_i$ of the base-stations. For systems that use N omnidirectional antennae, the cost function has the form $$F(x_1, y_1, p_1, \ldots, x_N, y_N, p_N) = \alpha U + (1-\alpha)I \quad (1)$$

where U is the size of the uncovered area, I is the size of the interference area, and $\alpha$ is a scaling constant selected such that $\alpha \in [0,1]$.

When adaptive antenna arrays are employed, the second term of the cost function in Equation (1) is modified to reflect the dynamic nature of the system [7]:

$$F(x_1, y_1, p_1, \ldots, x_N, y_N, p_N) = \alpha U + (1 - \alpha) \sum_i I_i P(\text{interference in area } I_i) \quad (2)$$

where $I_i$ is interference area i and P is a probability of interference in area $I_i$. Enhancements and extensions of this cost function for different wireless systems are also possible without affecting the operation of the tool and the optimization process.

The cost function calculation module relies on estimates of signal attenuation from the indoor radio channel prediction module and on information provided by the environment description module to evaluate the cost function at every point of the building floor. This evaluation is performed for both omnidirectional and adaptive systems. The result is output to the optimization methods module or directly to the screen when the user has specifically requested the value of the cost function for a given configuration.

The optimization methods module is responsible for finding optimal configurations for a given network. It employs a user-selected one of the three optimization methods:
1. Modified Steepest Descent
2. Downhill Simplex
3. Hopfield Neural Network The first two methods search for the optimal solution in the continuous space of the arguments of the cost function, while the neural network works in discrete space. In addition, an exhaustive search routine is provided for validation of the results of the optimization methods.

A possible location for each base station is characterized by coordinates $(x_i, y_i)$. For continuous space, $x_i \in [0, X_{max}]$, and $y_i \in [0, Y_{max}]$. On the other hand, for discrete space, x takes discrete values from one through $X_{max}$, while $y_i$ takes discrete values from one through $Y_{max}$. There is also a maximum energy $P_{max}$ determined by the energy constraints of the network; the power of each base station can be considered to vary continuously or discretely, depending on the optimization method.

The optimization methods module can be very easily enhanced with new methods. The user can define which subset of the cost function parameters should be involved in the optimization procedure. In each step of the optimization procedure, the value of the cost function is provided by the cost function calculation module. The output of the module is sent to the user interface and is displayed on the screen. The user can run the optimization several times to obtain multiple locally optimal solutions and select the best one.

A detailed description of the optimization methods named above can be found in [8]. A few salient details of the Hopfield neural network method will also be noted here.

The Hopfield neural network method treats optimization as a combinatorial problem in which the base stations can be located only on points of a grid and further are excluded from the finite set OB of points that are blocked. The power of each base station is equal to one of a set P of discrete power levels. For N base stations, the number $N_S$ of possible solutions is $$N_S = \binom{(X_{max} Y_{max} - |OB|)|P|}{N} \quad (3)$$

where $|\cdot|$ denotes the cardinality of any set. This number can be very large for even small areas. For example, for $X_{max} = Y_{max} = 15$, $|OB| = 30$, $|P| = 20$, and $N=3$, $N_S$ is approximately $10^{10}$.

The Hopfield Neural Network (HNN) method employs an artificial neural network having a number n of neurons given by $n = (X_{max} Y_{max} - |OB|)|P|$. The inputs to the network include N, $p_i$ for i=1 to N, the data in the layout and attenuation files, and instead of initial guess values for $(x_i, y_i)$, i=1 to N, only a choice of initial HNN state is needed. Because the method produces only a local optimization, as opposed to a global optimization, it is advantageous to run the method several times for different initial guess values and to use the best one of the optimizations for actual base station placement.

The graphical user interface (GUI) module provides a simple interactive mechanism for controlling the operation of the preferred embodiment. The GUI is, in its entirety, developed in Matlab, although any other suitable programming language can be used. It enables the user to do the following:

Load area layouts;

Get predictions of the attenuation curves in three different display modes;

Set up interactively network configurations defining the type, location power and communication characteristics of the base-stations;

Obtain estimates of the cell area and the cost function value;

Select the subset of optimization variables;

Choose the optimization method; and

Obtain the solution to the optimal base-station placement problem.

The recursive procedure of finding the configuration that satisfies the designer's criteria can be performed easily, as all commands and parameter values are entered using the mouse, action buttons, pop-up menus, and windows. No typing is necessary, although all commands can be executed by typing them at the special input/output window. All of these interface features will be familiar to those skilled in the art; the specifics of these features do not limit the invention and will not be described in detail.

A typical session of the operation of the preferred embodiment will now be described with reference to FIGS. 3–7. These figures show a graphical user interface which changes appearance throughout a typical session; the various forms are designated by reference numerals 300, 400, . . . 700. In these figures, the shading represents what is shown on the screen. The shading can represent the difference between blocked and unblocked points, as in FIGS. 3–5, or various levels of signal strength, as in FIGS. 6 and 7. The designer observes the shading and thus has the ability to reach more accurate conclusions.

Figure 3:
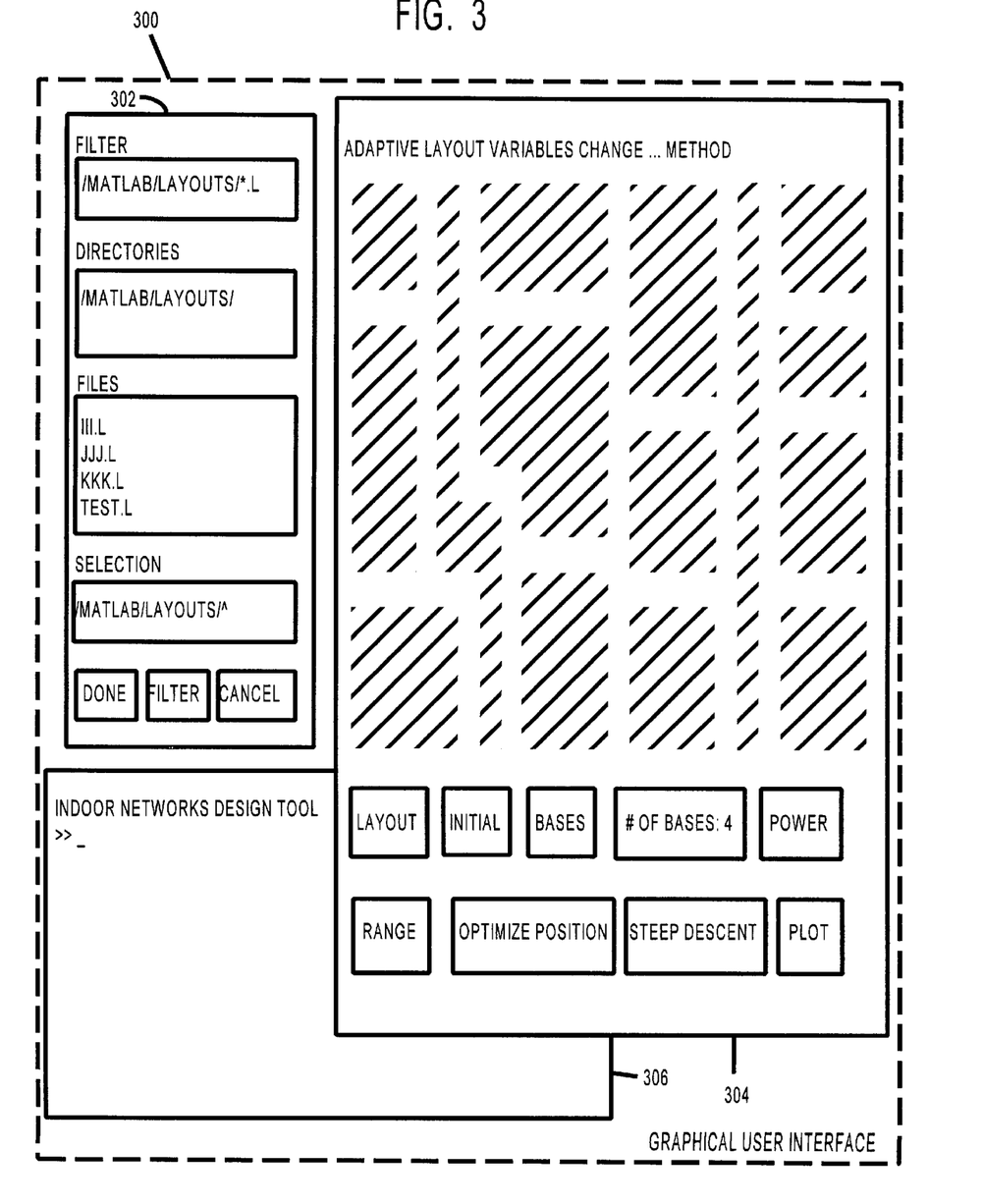
FIG. 3 shows a graphical user interface of the preferred embodiment during a step of loading layout and attenuation files for an area.

The designer begins by using graphical user interface 300 of FIG. 3 to load the layout of the area in which the network will operate. All the available layouts (both .l and .a files) are kept in the directory "./Layouts" and can be accessed through special "Load" pop-up window 302. The layout selected is shown in window 304, which allows the designer to view the layout and to select various options by clicking on buttons. The designer can also type commands into command prompt window 306.

Figure 4:
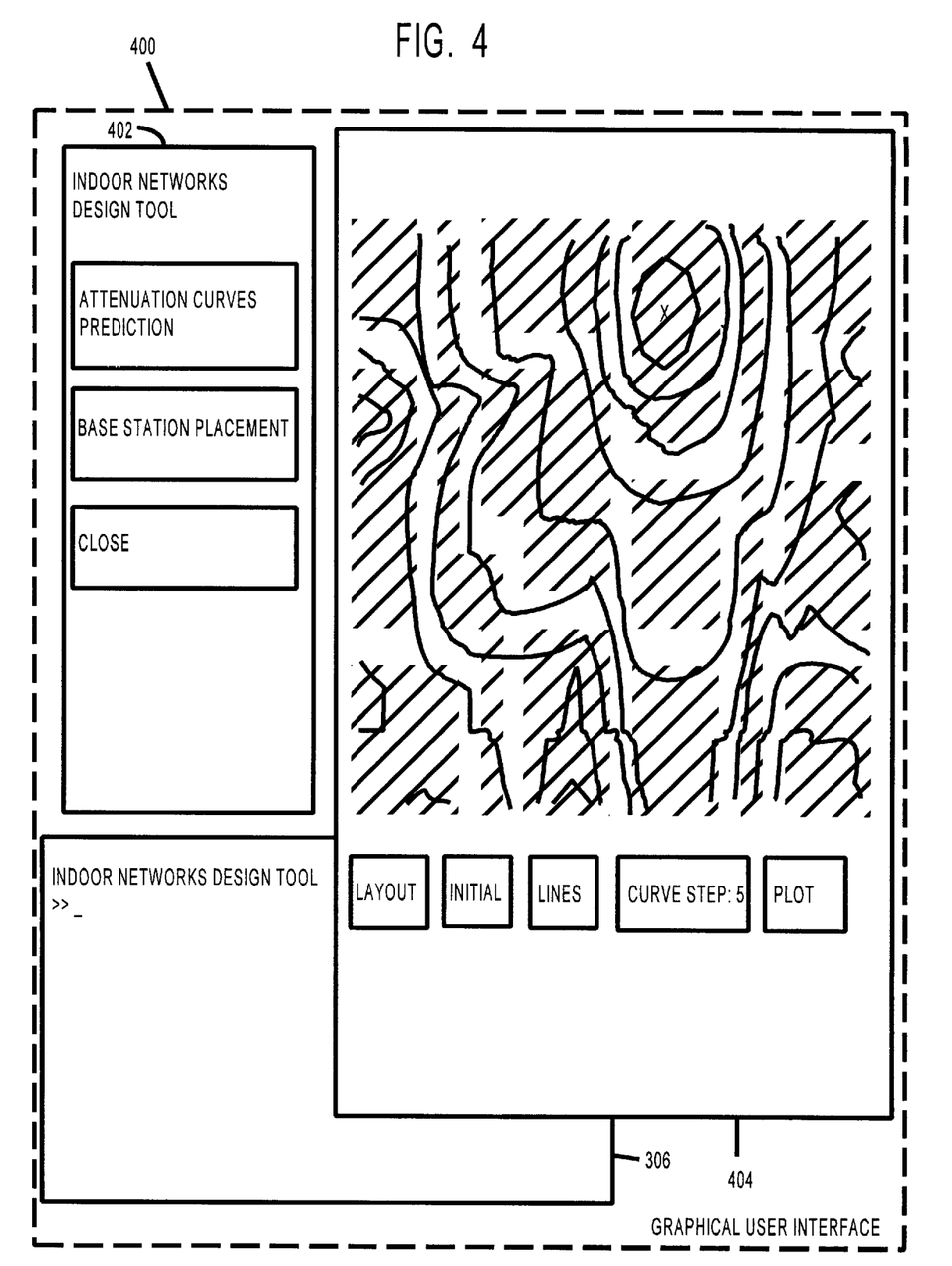
FIG. 4 shows the same graphical user interface during a step of displaying attenuation curves.

Once the layout is loaded, in order to get some insight into the propagation characteristics of the area, the designer uses the radio channel prediction module through graphical user interface 400 of FIG. 4. For different base-station locations, the attenuation curves are drawn on the floor and displayed in window 404. Other options can be selected with the buttons in this window, with window 402, or with command prompt window 306.

Figure 5:
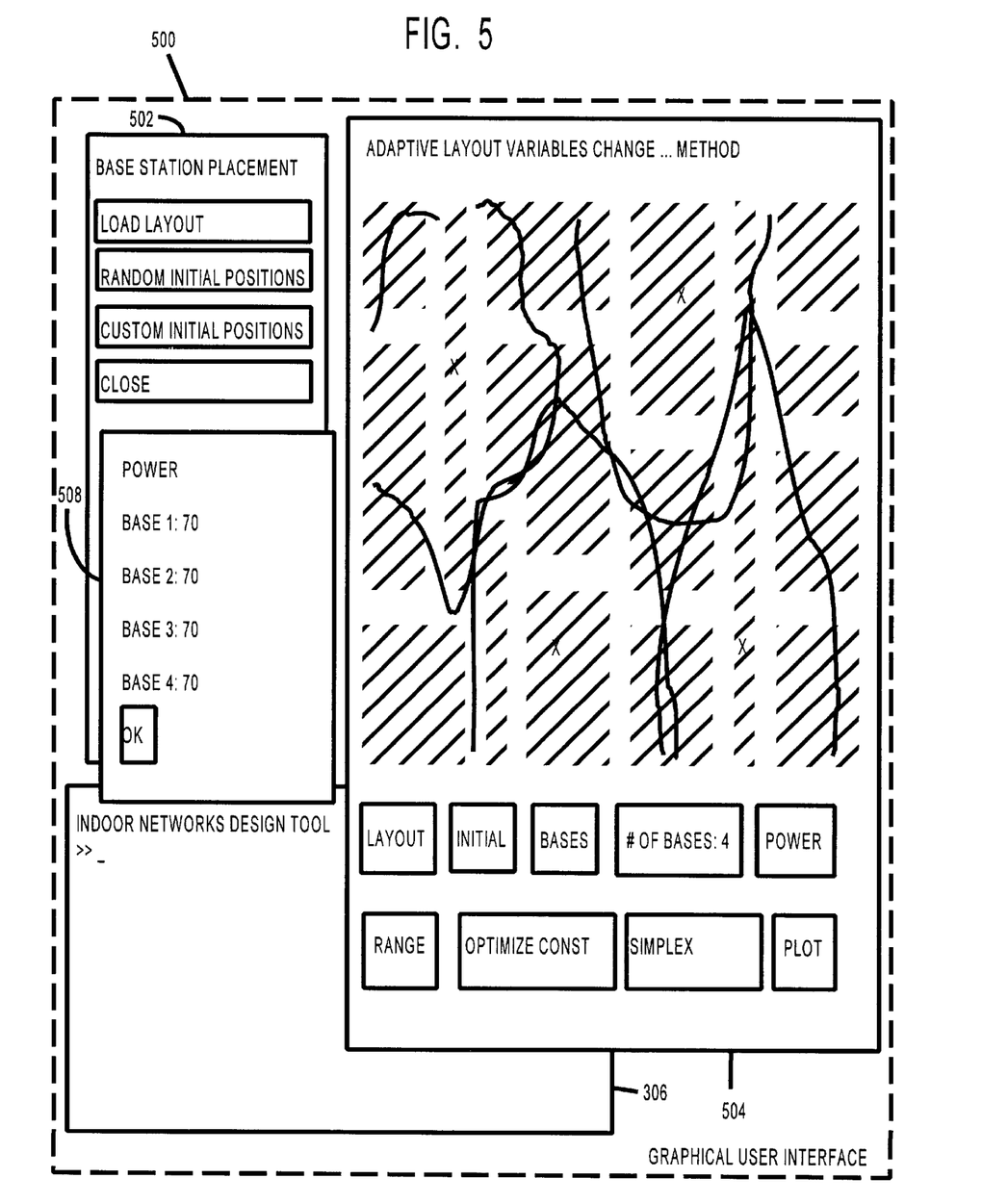
FIG. 5 shows the same graphical user interface during a step of displaying boundaries of cell areas.

Then, the designer can try out several network configurations through graphical user interface 500 of FIG. 5. This graphical user interface offers pop-up window 502 for selection of the initial positions, window 504 to view the boundaries of the cell areas, window 508 to select the power of each base station, and command prompt window 306. Given the number of the base stations, and for given base station locations and powers, the boundaries of the cell areas of the base stations are drawn. If the area that stays uncovered exceeds the requirements, a new configuration should be entered by moving the base stations, adjusting their power, or adding new base stations.

Figure 6:
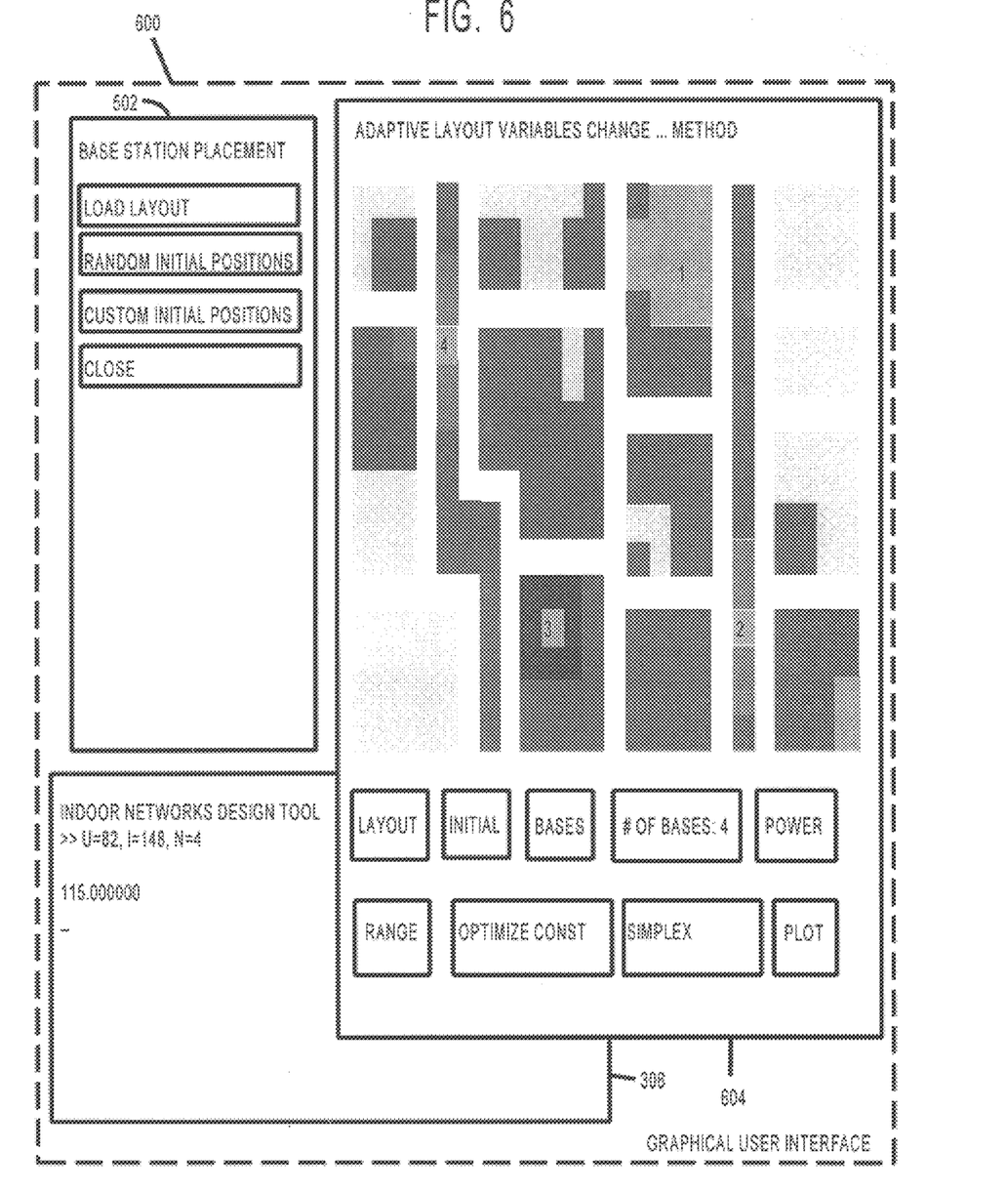
FIG. 6 shows the same graphical user interface during a step of displaying covered, uncovered and interference areas for given transmitter locations and power levels.

Otherwise, the designer can proceed in calculating the cost function for the desired network configuration, using graphical user interface 600 of FIG. 6. Here the covered area of each base-station, the interference area, and the uncovered area are indicated in window 604 by different colors, different shading styles, or any other convention that suits the graphics hardware. This graphical user interface also offers windows 502 and 306, which have already been described.

Figure 7:
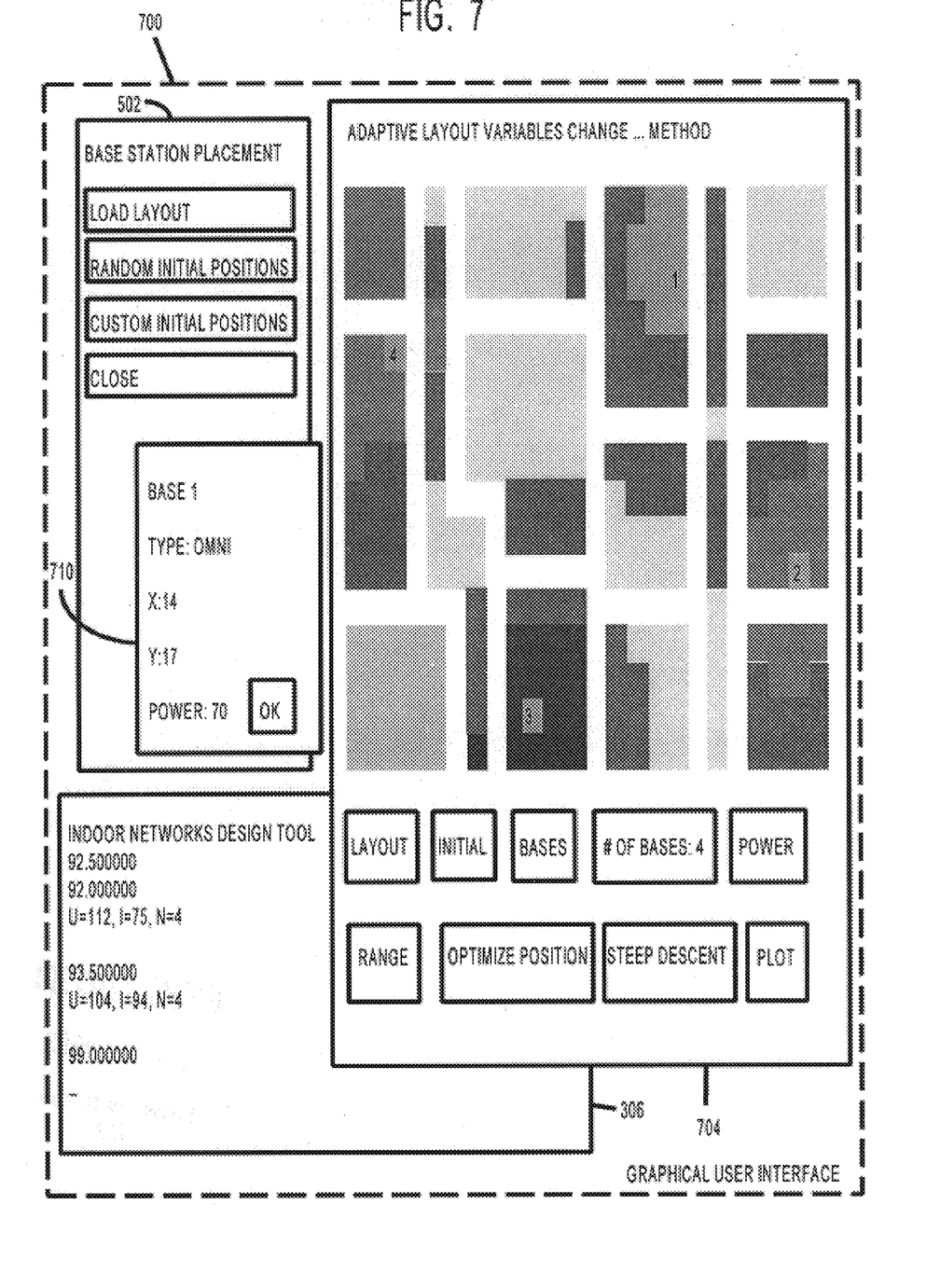
FIG. 7 shows the same graphical user interface during a step of displaying an optimal solution.

Finally, after specifying the optimization method and the subset of parameters of the cost function, the designer can get an optimal solution based on the initial setup using graphical user interface 700 of FIG. 7. The optimal solution is shown in window 704, while window 710 allows the designer to select the type, location (x and y coordinates), and power for each base station. Windows 306 and 502, which have already been described, are also available. Since even minor changes in the base station locations and powers may cause large variations of the cost function, this procedure should be iterated several times until the configuration that not only satisfies the requirements but also provides the global optimum network capacity is found.

Figure 8:
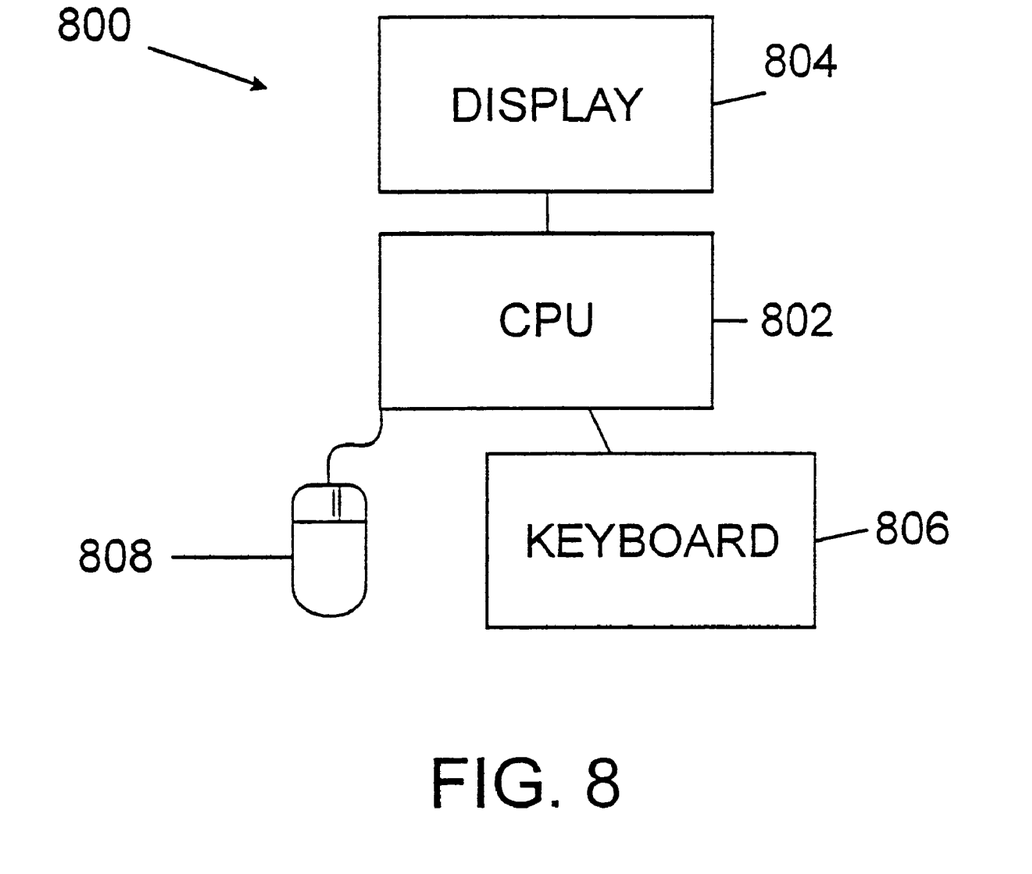
FIG. 8 shows a block diagram of a computing device on which the preferred embodiment can be implemented.

The present invention can be implemented on a computing device such as computing device 800 shown in FIG. 8. Such a computing device includes CPU 802 in which the programs are run, output means such as display 804 for displaying screens such as those of FIGS. 3–7 to the user, and input means for receiving commands and information from the user. The input means can include one or more of keyboard 806, mouse 808, a digitizing tablet, and similar input devices.

While a preferred embodiment of the present invention has been disclosed, those skilled in the art who have reviewed this disclosure will readily appreciate that other embodiments can be implemented as needed. For example, the indoor radio channel prediction module, the base-station range module, and the cost function calculation module can be modified to use any algorithm for performing their functions, whether known now or developed later. Any programming language can be used, and the present invention can be implemented on any microcomputer, workstation, minicomputer, mainframe, or other computing device. A graphical user interface other than that disclosed, such as a Web-based interface, can be used, or the interface can be text-based or a combination of graphics-based and text-based. Another coordinate system, such as a polar coordinate system, can be used if the Cartesian coordinate system is not the most useful one. These and other modifications can be combined as needed. Therefore, the present invention should be construed as limited only by the appended claims.

We claim:

1. A method of placing a number N of transmitters in a service area which has unblocked points where the transmitters may be located and blocked points in which the transmitters may not be located, each of the transmitters having a power $p_i$, i=1 to N, the method comprising:

(a) providing a processor which comprises an input means for receiving an input from a user and an output means for displaying an output to the user;

(b) inputting to the processor, by use of the input means, data comprising N, $p_i$ for i=1 to N, a blocked point location data set identifying locations of the blocked points, an attenuation data set identifying attenuation characteristics of both the blocked points and the unblocked points, and initial guess values for $(x_i, y_i, p_i)$, i=1 to N, where $(x_i, y_i)$ are x and y coordinates for the ith transmitter and $p_i$ is the power of the ith transmitter;

(c) calculating in the processor, in accordance with the data input in step (b), attenuation characteristics for each of the transmitters;

(d) calculating in the processor, in accordance with the attenuation characteristics calculated in step (c), (i) a size U of an uncovered area in which signals from the transmitters could not reach if the transmitters were positioned at the initial guess values, (ii) a size I of an interference area in which interference among the signals from the transmitters would prevent service if the transmitters were positioned at the initial guess values, and (iii) a cost function F which is a function of $(x_i, y_i, p_i)$, i=1, ... N given by a linear combination of U and I;

(e) by use of the processor, optimizing the cost function to produce an optimized set of transmitter locations and powers;

(f) outputting to the user, by use of the output means, locations and powers of the transmitters which achieve the optimized cost function produced in step (e) and (g) placing the transmitters in the locations output in step (f).

2. A method as in claim 1, wherein, during step (e), $x_i$, $y_i$ and $p_i$ are permitted to vary among a plurality of discrete values.

3. A method as in claim 2, wherein step (a) comprises configuring the processor to function as an artificial neural network.

4. A method as in claim 3, wherein step (e) comprises optimizing the cost function by a Hopfield neural network technique.

5. A method as in claim 4, wherein:

$x_i$ is permitted to vary discretely among values 1, 2, 3, ... $X_{max}$;

$y_i$ is permitted to vary discretely among values 1, 2, 3, ... $Y_{max}$;

a number of the blocked points in the service area is $|OB|$;

a number of possible values of $p_i$ is $|P|$; and the artificial neural network has a number of neurons equal to $n=(X_{max}Y_{max}-|OB|)|P|$.

6. A method as in claim 1, wherein, during step (e), $x_i$ and $y_i$ are permitted to vary continuously.

7. A method as in claim 6, wherein step (e) is performed by a steepest descent method.

8. A method as in claim 6, wherein step (e) is performed by a simplex method.

9. A method as in claim 1 wherein $F=\alpha U+(1-\alpha)I$, where $\alpha \in [0,1]$.

10. A method as in claim 9, wherein the transmitters are omnidirectional.

11. A method as in claim 9, wherein:

the transmitters are adaptive;

the interference area is made up of a plurality of areas having sizes $I_i$, i=1 to N, each of the plurality of areas having a probability of interference $P_i$; and $$I = \sum_i I_i P_i.$$

12. A method as in claim 1, wherein:

the processor further comprises storage means for storing blocked point data sets and attenuation data sets for a plurality of area layouts; and step (b) comprises:

(i) prompting the user, by use of the output means, to make a selection of one of the plurality of area layouts;

(ii) receiving from the user, by use of the input means, the selection made by the user; and (ii) loading, from the storage means, one of the blocked point data sets and one of the attenuation data sets corresponding to the selection made by the user.

13. A method as in claim 1, wherein step (e) comprises:

(i) prompting the user, by use of the output means, to make a selection of one of a plurality of optimization methods;

(ii) receiving from the user, by use of the input means, the selection made by the user; and (iii) optimizing the cost function by implementing in the processor the one of the plurality of optimization methods selected by the user.

14. A method as in claim 1, wherein step (b) comprises:

(i) prompting the user, by use of the output means, to make a selection of whether the initial guess values are to be randomly generated or input by the user;

(ii) receiving the selection from the user by use of the input means;

(iii) if the user selects a random generation, randomly generating the initial guess values in the processor; and (iv) if the user selects input of the initial guess values by the user, receiving an input of the initial guess values from the user through the input means.

15. A method as in claim 1, wherein:

step (b) comprises inputting multiple sets of the initial guess values;

steps (e) and (f) are performed for each of the multiple sets of initial guess values to yield a plurality of optimizations; and step (g) comprises:

(i) selecting one of the plurality of optimizations; and
(ii) placing the transmitters in accordance with the one of the plurality of optimizations which is selected.

16. A method as in claim 1, wherein the output means comprises means for implementing a graphical user interface.

17. A method as in claim 16, further comprising (h) displaying to the user, with the output means, a graphical representation of at least one of (i) the attenuation characteristics calculated in step (c) and (ii) a further set of attenuation characteristics calculated in accordance with the locations and powers of the transmitters which are output in step (f).

18. A method as in claim 17, wherein, in step (h), said at least one of the attenuation characteristics and the further set of attenuation characteristics comprises a signal strength at each of the unblocked points, and the graphical representation indicates the signal strength at said each of the unblocked points.

19. A method as in claim 18, wherein:

the means for implementing a graphical user interface comprises means for displaying a plurality of types of shading; and step (h) comprises indicating the signal strength at said each of the unblocked points by one of the plurality of types of shading.

20. A device for determining locations of a number N of transmitters in a service area which has unblocked points where the transmitters may be located and blocked points in which the transmitters may not be located, each of the transmitters having a power $p_i$, i=1 to N, the device comprising:

input means for receiving an input of data comprising N, $p_i$ for i=1 to N, a blocked point location data set identifying locations of the blocked points, an attenuation data set identifying attenuation characteristics of both the blocked points and the unblocked points, and initial guess values for $(x_i, y_i)$, i=1 to N, where $(x_i, y_i)$ are x and y coordinates for an ith one of the transmitters;

means for calculating, in accordance with the input of data received by the input means, attenuation characteristics for each of the transmitters;

means for calculating, in accordance with the attenuation characteristics, (i) a size U of an uncovered area in which signals from the transmitters could not reach if the transmitters were positioned at the initial guess values, (ii) a size I of an interference area in which interference among the signals from the transmitters would prevent service if the transmitters were positioned at the initial guess values, and (iii) a cost function F which is a function of $(x_i, y_i, p_i)$ and given by a linear combination of U and I;

optimizing means for optimizing the cost function to produce an optimal set of transmitter locations and powers; and output means for outputting to the user locations and powers of the transmitters which achieve the optimal value of the cost function produced by the optimizing means.

21. A method of placing a number N of transmitters in a service area which has unblocked points where the transmitters may be located and blocked points in which the transmitters may not be located, each of the transmitters having a power $p_i$, i=1 to N, the method comprising:

(a) providing a processor which comprises an input means for receiving an input from a user and an output means for displaying an output to the user;

(b) inputting to the processor, by use of the input means, data comprising N, $p_i$ for i=1 to N, a blocked point location data set identifying locations of the blocked points, an attenuation data set identifying attenuation characteristics of both the blocked points and the unblocked points, and initial guess values for $(x_i, y_i, p_i)$, i=1 to N, where $(x_i, y_i)$ are x and y coordinates for the ith transmitter and $p_i$ is the power of the ith transmitter;

(c) calculating in the processor, in accordance with the data input in step (b), attenuation characteristics for each of the transmitters;

(d) calculating in the processor, in accordance with the attenuation characteristics calculated in step (c), (i) a size U of an uncovered area in which signals from the transmitters could not reach if the transmitters were positioned at the initial guess values, (ii) a size I of an interference area in which interference among the signals from the transmitters would prevent service if the transmitters were positioned a the initial guess values, and (iii) a cost function F which is a function of $(x_i, y_i, p_i)$, i=1, ... N given by a linear combination of U and I;

(e) by use of the processor, optimizing the cost function to produce an optimized set of transmitter locations and powers, wherein $x_i$, $y_i$, $p_i$ are permitted to vary among a plurality of discreet values;

(f) outputting to the user, by use of the output means, locations and powers of the transmitters which achieve the optimized cost function produced in step (e); and (g) placing the transmitters in the locations output in step (f).

* * * * *